US010247379B2

(12) United States Patent
Grafeneder et al.

(10) Patent No.: US 10,247,379 B2
(45) Date of Patent: Apr. 2, 2019

(54) VEHICLE HEADLAMP

(71) Applicant: ZKW Group GmbH, Wieselburg (AT)

(72) Inventors: Markus Grafeneder, Opponitz (AT); Thomas Schlinger, Boeheimkirchen (AT); Sebastian Godderidge, Roggendorf (AT); Jürgen Zorn, Oberfucha (AT)

(73) Assignee: ZKW Group GmbH, Wieselburg (AT)

(*) Notice: Subject to any disclaimer, the term of this patent is extended or adjusted under 35 U.S.C. 154(b) by 236 days.

(21) Appl. No.: 15/513,739

(22) PCT Filed: Sep. 7, 2015

(86) PCT No.: PCT/AT2015/050216
§ 371 (c)(1),
(2) Date: Mar. 23, 2017

(87) PCT Pub. No.: WO2016/044870
PCT Pub. Date: Mar. 31, 2016

(65) Prior Publication Data
US 2017/0292669 A1    Oct. 12, 2017

(30) Foreign Application Priority Data
Sep. 24, 2014 (AT) .............................. A 50683/2014

(51) Int. Cl.
*B60Q 1/04* (2006.01)
*F21S 41/19* (2018.01)
(Continued)

(52) U.S. Cl.
CPC .............. *F21S 41/198* (2018.01); *B60Q 1/04* (2013.01); *F21S 41/141* (2018.01);
(Continued)

(58) Field of Classification Search
None
See application file for complete search history.

(56) References Cited

U.S. PATENT DOCUMENTS

| 8,967,843 B2 | 3/2015 | Jackl et al. |
| 9,534,755 B2 | 1/2017 | Blandin et al. |

(Continued)

FOREIGN PATENT DOCUMENTS

JP    2013-030371 A    2/2013

OTHER PUBLICATIONS

Search report issued in Austrian application No. A 50683/2014, completed Aug. 5, 2015.
(Continued)

*Primary Examiner* — Britt D Hanley
(74) *Attorney, Agent, or Firm* — Eversheds Sutherland (US) LLP

(57) ABSTRACT

In a vehicle headlight comprising a light module (1) with a light source support (3), with at least one light source (17) and a reflector part (5) associated with the at least one light source (17), it being possible for reference elements (24) on the reflector part (5) to be brought into an operative connection with corresponding reference elements (25) on the light source support (3), the light source support (3) can be pushed into a guide part (2) with guide rails (6) for the reflector part (5), and the reflector part (5) has a catch (22) associated with the light source support (3) to displace the reflector part (5) together with the light source support (3) along the guide rails (6), which are designed to bring the reference elements (24) on the reflector part (5) into an operative connection with the corresponding reference elements (25) on the light source support (3) when the light source support (3) is pushed in.

10 Claims, 7 Drawing Sheets

Figure 1:
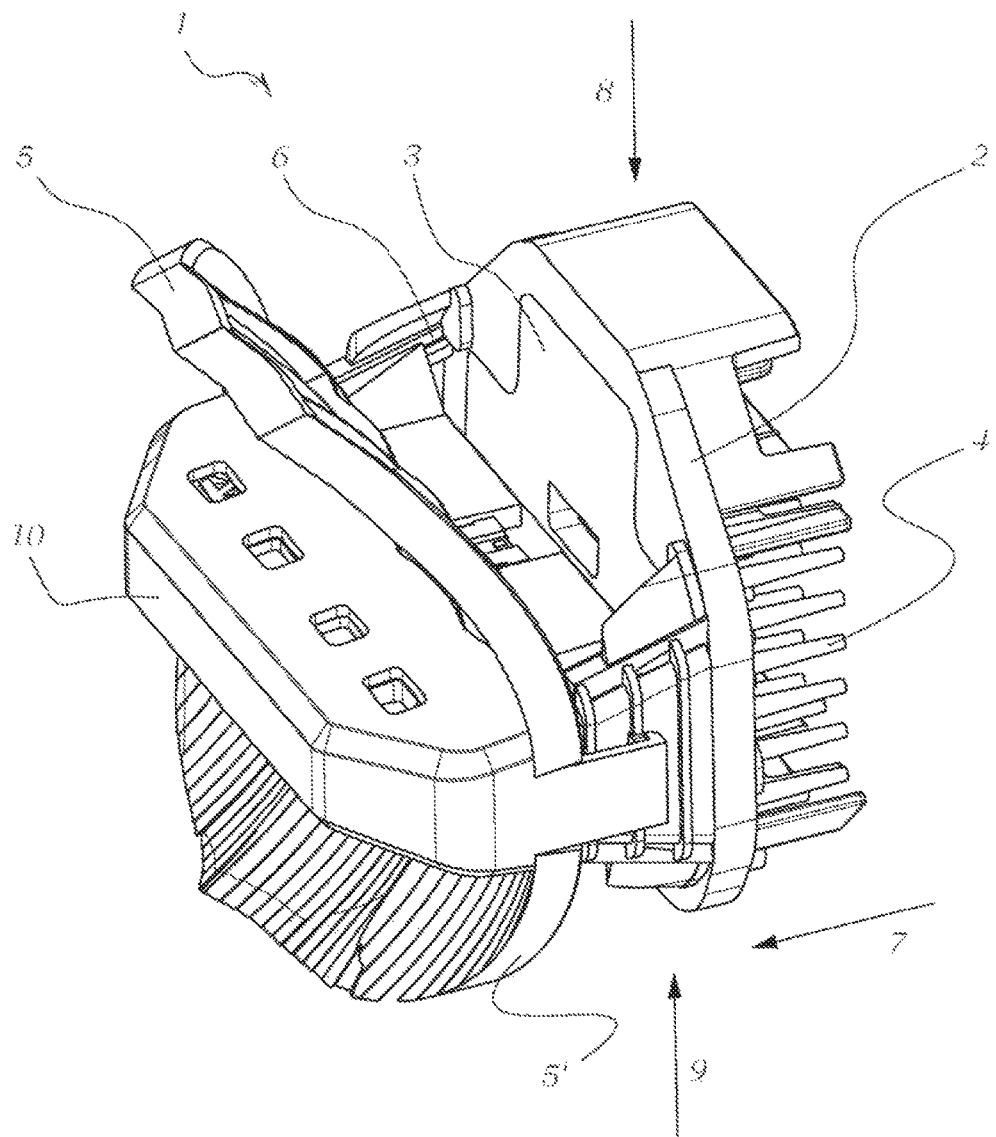

(51) Int. Cl.
*F21S 41/32* (2018.01)
*F21S 41/39* (2018.01)
*F21S 43/00* (2018.01)
*F21S 45/47* (2018.01)
*F21S 41/141* (2018.01)
*F21S 41/147* (2018.01)
*F21Y 115/10* (2016.01)

(52) U.S. Cl.
CPC ............ *F21S 41/147* (2018.01); *F21S 41/19* (2018.01); *F21S 41/32* (2018.01); *F21S 41/39* (2018.01); *F21S 43/00* (2018.01); *F21S 45/47* (2018.01); *F21S 41/192* (2018.01); *F21Y 2115/10* (2016.08)

(56) References Cited

U.S. PATENT DOCUMENTS

| | | |
|---|---|---|
| 2010/0246204 A1 | 9/2010 | Inaba |
| 2012/0092884 A1 | 4/2012 | Dikau et al. |
| 2015/0369435 A1 | 12/2015 | Bauer et al. |

OTHER PUBLICATIONS

International Search Report for application PCT/AT2015/050216, dated Feb. 16, 2016.

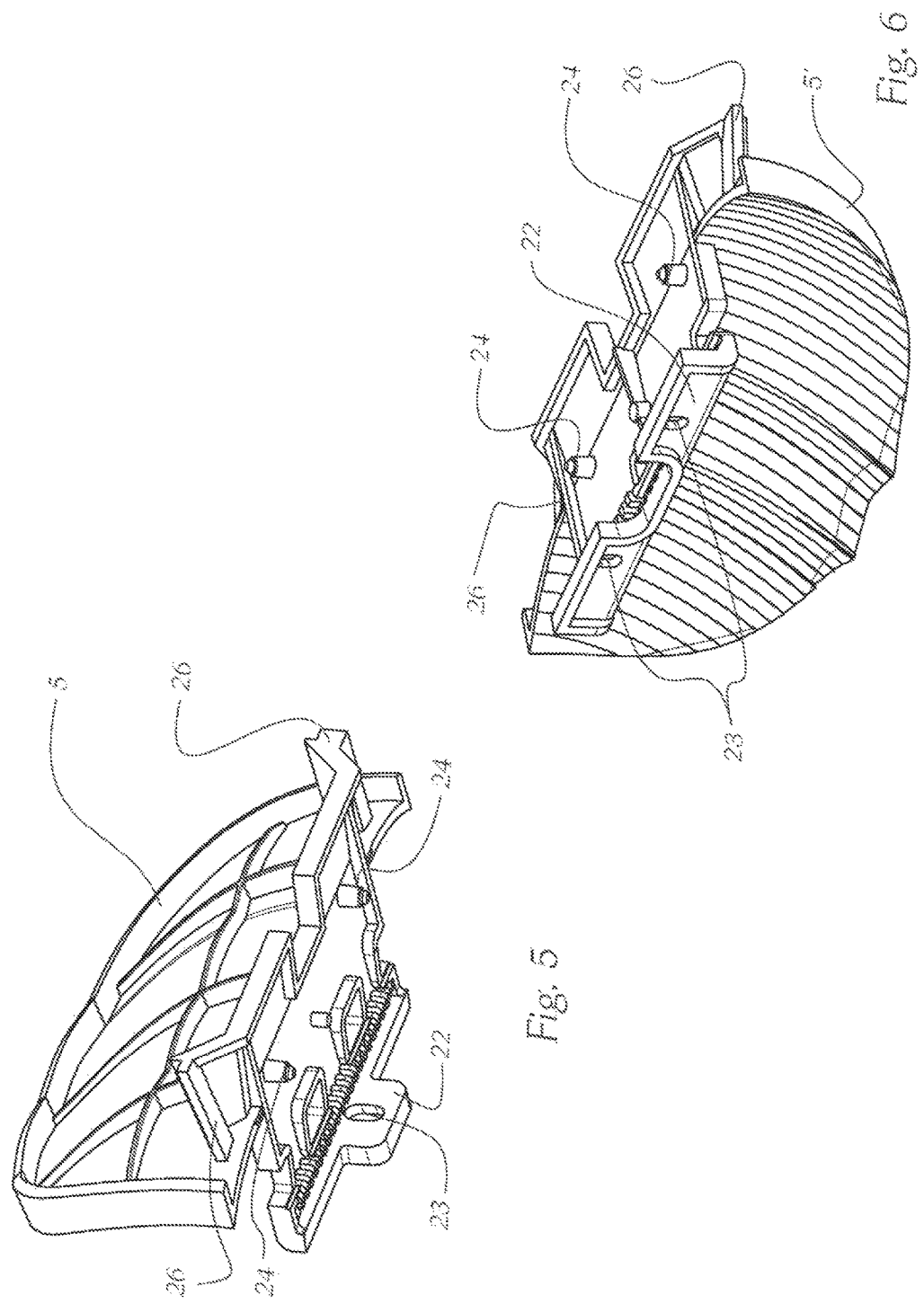

VEHICLE HEADLAMP

The invention relates to a vehicle headlight comprising a light module with a light source support, with at least one light source and a reflector part associated with the at least one light source, it being possible for reference elements on the reflector part to be brought into an operative connection with corresponding reference elements on the light source support.

LED technology has gradually been widely adopted in modern vehicle headlights; on the one hand, it allows very high luminous efficiency and great creative freedom in headlight design, due to the small size of the light sources and the other parts of the system. On the other hand, assembly of the individual parts of a light module of an LED vehicle headlight requires greater exactness and precision than is the case with conventional incandescent filament or halogen systems, since the very small light sources require very precise alignment with respect to the corresponding reflector parts, in order to meet the strict legal requirements concerning the light pattern, in particular to avoid blinding the oncoming traffic.

When the LED light sources are being placed on the light source supports or the circuit boards during the manufacturing of the latter, there are slight inaccuracies in positioning, for which reason it is not simple to position the corresponding reflectors with respect to edges of the light source support, due to the aforementioned high precision requirements. Instead, the real positions of the LEDs must be determined after the placement process, and corresponding reference marks made on the basis of these positions. This usually involves making the reference marks on the light source support in the form of reference holes with which corresponding reference pins on the respective reflector parts can be brought into an operative connection, i.e., into which the reference pins can engage, so that the reflector part can be aligned with respect to the real position of the LED light sources and mounted.

While this solution is completely satisfactory when a vehicle headlight is first assembled, it has disadvantages for the vehicle owner when replacing burned out LED light sources, in that working with prior art reflector parts would require removing, or at least largely dismantling the headlight to access the reflector parts, separate them from the light source support, and be able to connect them with a new light source support. This clearly should not be expected of the user, since it is considered completely unfavorable to expose parts such as reflectors that have a reflective coating which is extremely mechanically sensitive and on which even mere fingerprints already cause a substantial loss in performance of the corresponding headlight.

Therefore, the invention has the goal of improving the replacement of LED light sources in such a way that a replacement part with the LEDs can be pushed into the headlight, largely without the use of tools, and that the user can re-reference and realign the reflectors with the LEDs in a reliable manner without manipulating the reflectors.

The invention accomplishes this by further developing a vehicle headlight of the type mentioned at the beginning so that the light source support can be pushed into a guide part with guide rails for the reflector part, and the reflector part has a catch associated with the light source support to displace the reflector part together with the light source support along the guide rails, which are designed to bring the reference elements on the reflector part into an operative connection with the corresponding reference elements on the light source support when the light source support is pushed in. The fact that a guide part is provided for the light source support, this guide part also having guide rails which are intended for the reflector part and in which the reflector part is put into the reference elements or holes on the light source support by the effect of a catch when the new light source support is pushed in, automatically references the reflector part, so to speak, when the replacement part, i.e., the light source support, is pushed in, without it being necessary to touch the reflector part in any way. Here it is not a problem that the reference holes can, as described above, be located at positions on the circuit board that are also slightly different due to the slightly different positioning of the LEDs, since the differences on circuit boards found to be permissible are so small that the reference pins of the reflector part nevertheless find their way into the corresponding reference holes and the exact position only results at the very end, once the light source support is pushed in all the way. Thus, the inventive vehicle headlight allows simple and rapid replacement of the LED light sources with automatic re-referencing the reflector part, so that the reflectors do not have to be removed, not even only be touched, to align them with respect to the new LED positions.

The inventive vehicle headlight is preferably further developed in such a way that the light source support comprises a circuit board on which the light sources and the reference elements are arranged. Thus, the light source support consists of a support part, on which a circuit board that supports the light sources can be fixed. Thus; while it is conceivable, in the framework of this invention, to fix the light sources to the light source support even without a circuit board, in which case the reference elements are located on the support part, for example in the form of holes in the support part, the preferred variant, which is described in detail below, provides that the light sources be arranged on a circuit board, in which case the reference elements are also located on the circuit board, which in turn is arranged on the support part. Whenever the following description refers to the circuit board, the corresponding information can also refer to the case in which the light sources are arranged directly on the support part, without interposition of a circuit board.

According to the invention, the catch for the reflector part provides that the reflector part is displaced along the guide rails when the light source support is pushed into the guide part, the guide rails being suitably designed to take the reflector part out of a position in which the reference elements or pins on the reflector part do not engage into the corresponding reference elements or holes on the light source support, and put it into a position in which the reference elements or pins cooperate with the reference elements or holes. It will be clear to the person skilled in the art that in the case of holes and pins, the reflector part must be lowered in the direction of the circuit board in order to put the pins into the holes. And, on the other hand, pulling the light source support out must correspondingly involve raising the reflector part off the circuit board to release the reflector part. As long as the reference pins are located in the reference holes, the reflector part is moved together with the light source support when the latter is pulled out, and raised by the effect of the guide rails. However, as soon as the reference pins disengage, there is no further displacement in the guide rails, and thus there also cannot be any additional raising movement of the reflector part. Consequently, as the light source support is pulled out further, at least the reference pins of the reflector part lie on the conductor tracks of the circuit board and can, if the reflector part is pulled out further, cause scratches on the surface of the circuit board, in particular on the conductor tracks of the circuit board. To remedy this circumstance, a preferred embodiment of this invention provides that the light source support has an ejector on it for the reflector part, so that as the light source support is pulled out, the reflector part is displaced along the guide rails into a release position in which [the] reference pins on the reflector part are raised, by means of the guide rails, into a position in which they clear the conductor tracks of the light source support. Thus, a separate component is provided that ensures that the reflector part is displaced along the guide rails when the light source support is pulled out, even when the reference pins are no longer engaged with the reference holes in the circuit board, due to being guided in the guide rails, so that guidance in the guide rails can continue until the reference pins are, due to the effect of the guide rails when the reflector part is pulled out, which according to the invention displaces the reflector part in the guide rails of the guide part, sufficiently spaced from the circuit board that the reference pins do not damage the conductor tracks of the circuit board when the light source support is completely pulled out.

To ensure good guidance of the reflector part on the light source support, the invention is preferably further developed so that the catch on the reflector part has reference holes for engagement of the reference pins on the light source support.

LED light sources have a high energy density, for which reason it is, as a rule, necessary to take precautions to ensure that heat that occurs at very selective points in the area of the LED light sources is efficiently dissipated away from the circuit board. Therefore, in this connection the invention is preferably further developed so that the light source support is in the form of a heat sink for the light sources. According to this preferred embodiment, the light source support, whose basic function is to provide a planar mounting surface for the light sources or for the circuit board, is made of a material that has as good thermal conductivity as possible and a sufficient mass to absorb heat that occurs at selective points on the circuit board in the area of the LED light sources, and distribute it in the heat sink.

In this connection, it is especially preferred for the light source support to consist of cast aluminum and to have multiple cooling elements on its end facing away from the circuit board.

According to a preferred embodiment of this invention, the guide part, unlike the light source support, consists of plastic. First, plastics are good for injection molding, and second they provide sufficient strength and good durability of the guide part.

The description up to here and also the claims speak of a reflector part which is displaced in guide rails for a reflector part, if the light source support with the circuit board is pushed into the guide part or pulled out of the guide part, in order to make the reference elements or pins on the reflector part engage and disengage with the corresponding reference elements or holes in the circuit board. According to a preferred embodiment of this invention, it can be provided that the reflector part comprises multiple reflectors. As the description of the figures further below will emphasize even more clearly, the reflector part can form multiple reflectors, to allow different light functions of the vehicle headlight by interacting with the corresponding LED light sources.

Although up to now [the description of] the invention has referred mostly to one light source support, one circuit board, and one reflector part, a preferred embodiment of this invention can provide that on the guide part there are guide rails for at least two reflector parts that are opposite one another with respect to the light source support plane or the support part, it being possible for all described details to apply in the same way for the opposite reflector parts and the associated circuit boards and guide rails.

As has already been mentioned several times, it is preferred in connection with this invention that the at least one light source is in the form of an LED light source. However, the invention can also advantageously be used wherever very small light sources, which require especially precise alignment of the corresponding reflectors due to their small size, to be used in a vehicle headlight.

Figure 2:
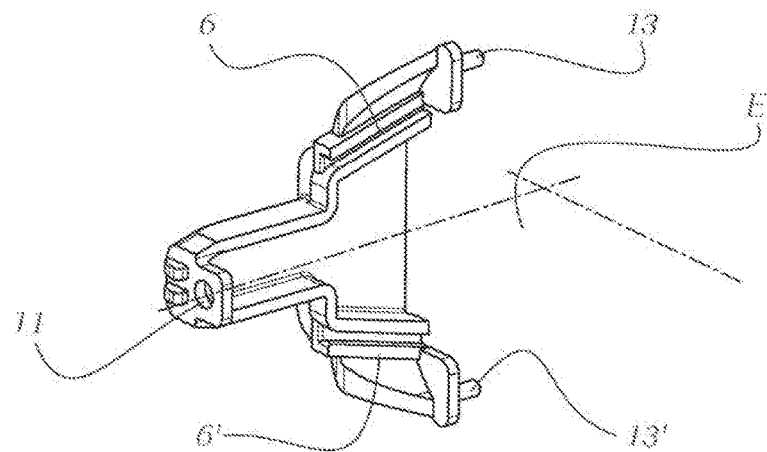
Figure 3:
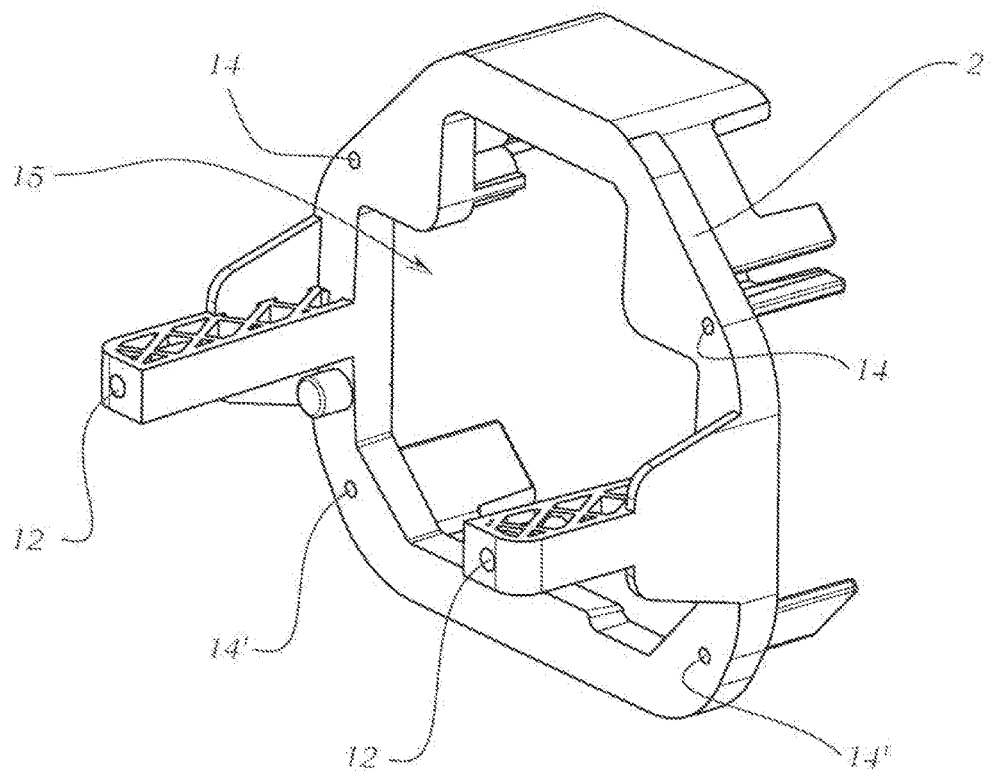
Figure 4:
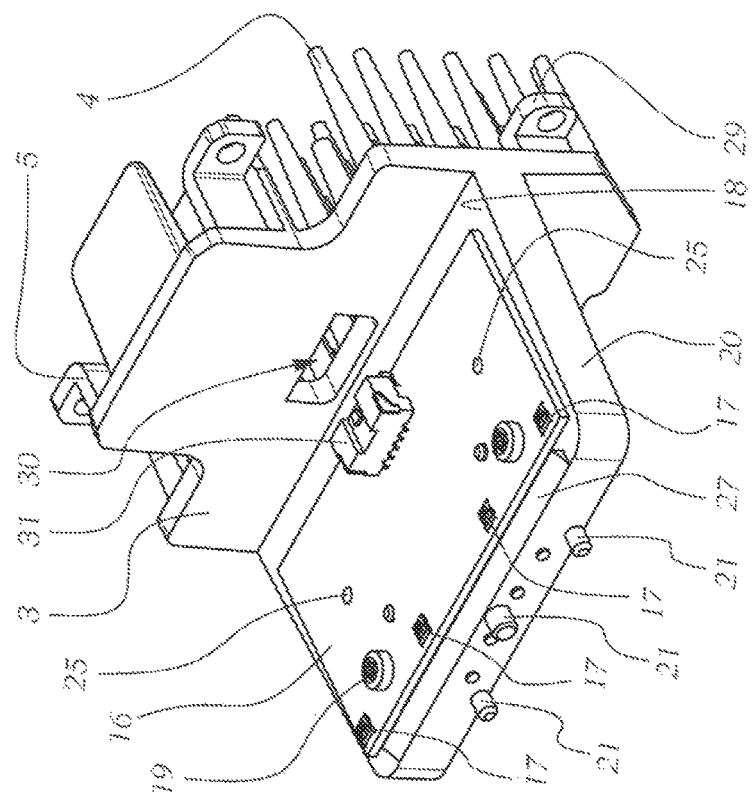
Figure 7:
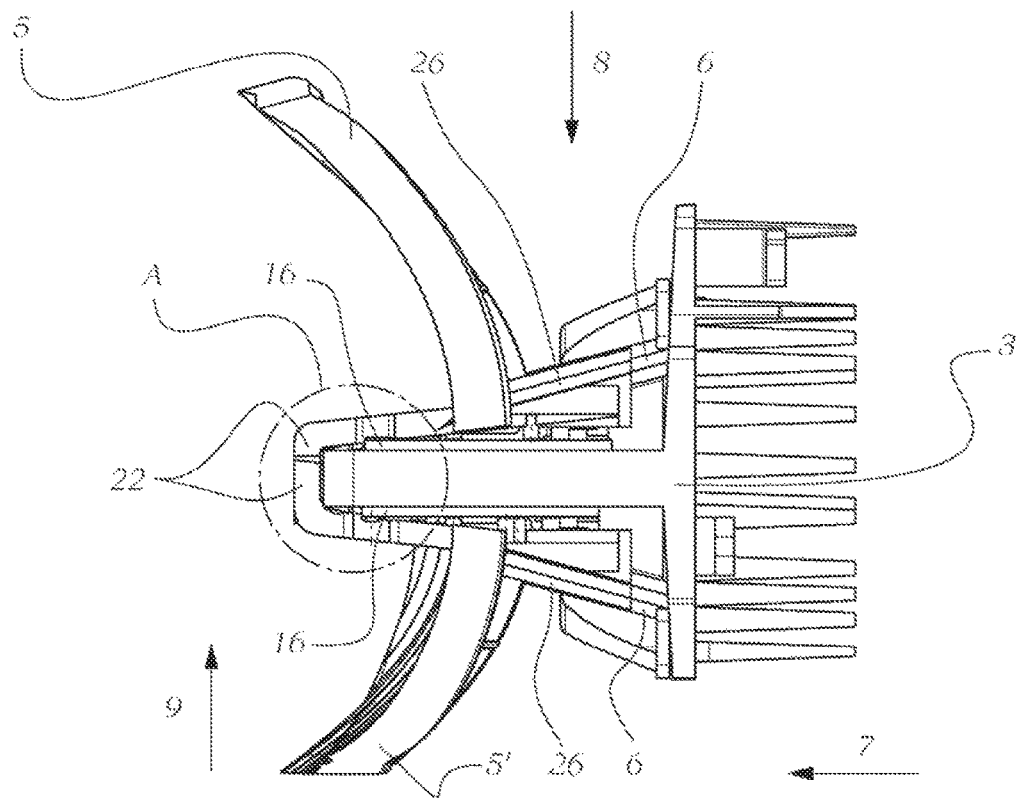
Figure 8:
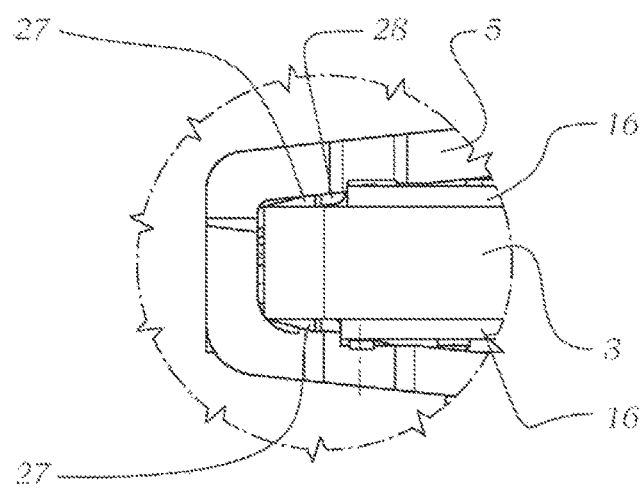
Figure 9:
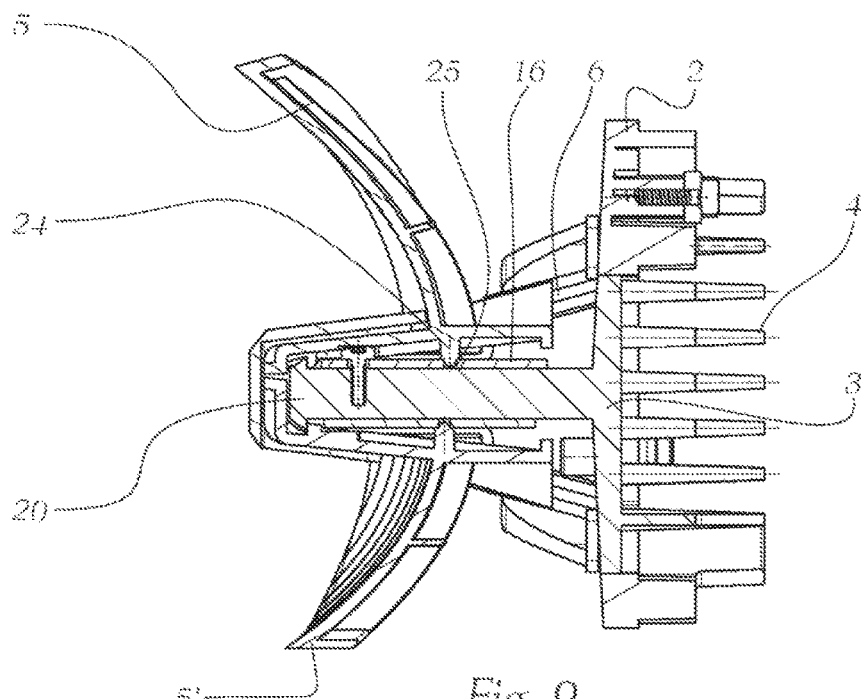
Figure 10:
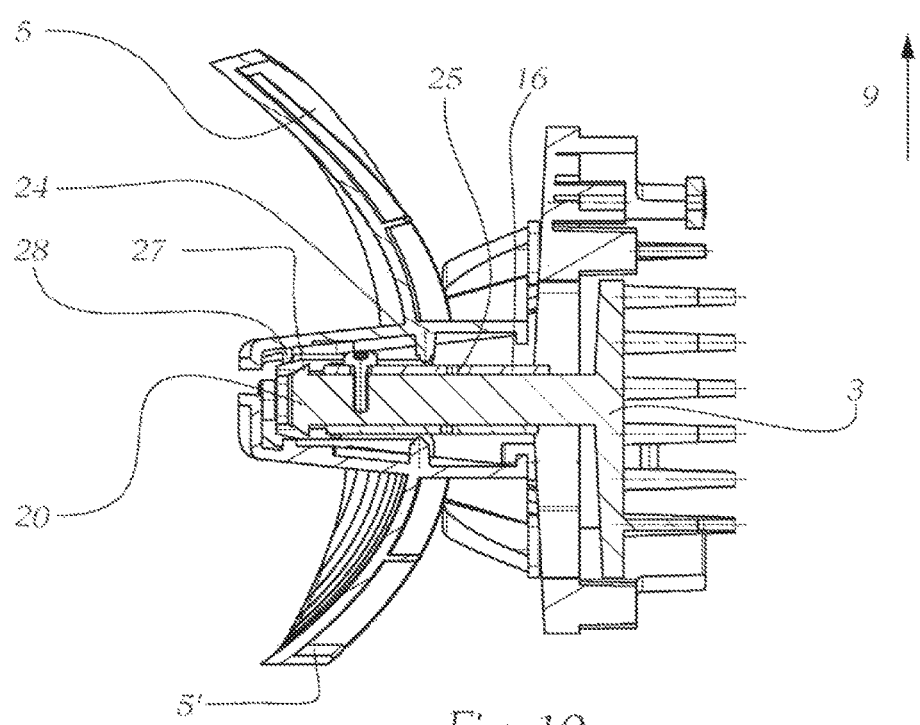
Figure 11:
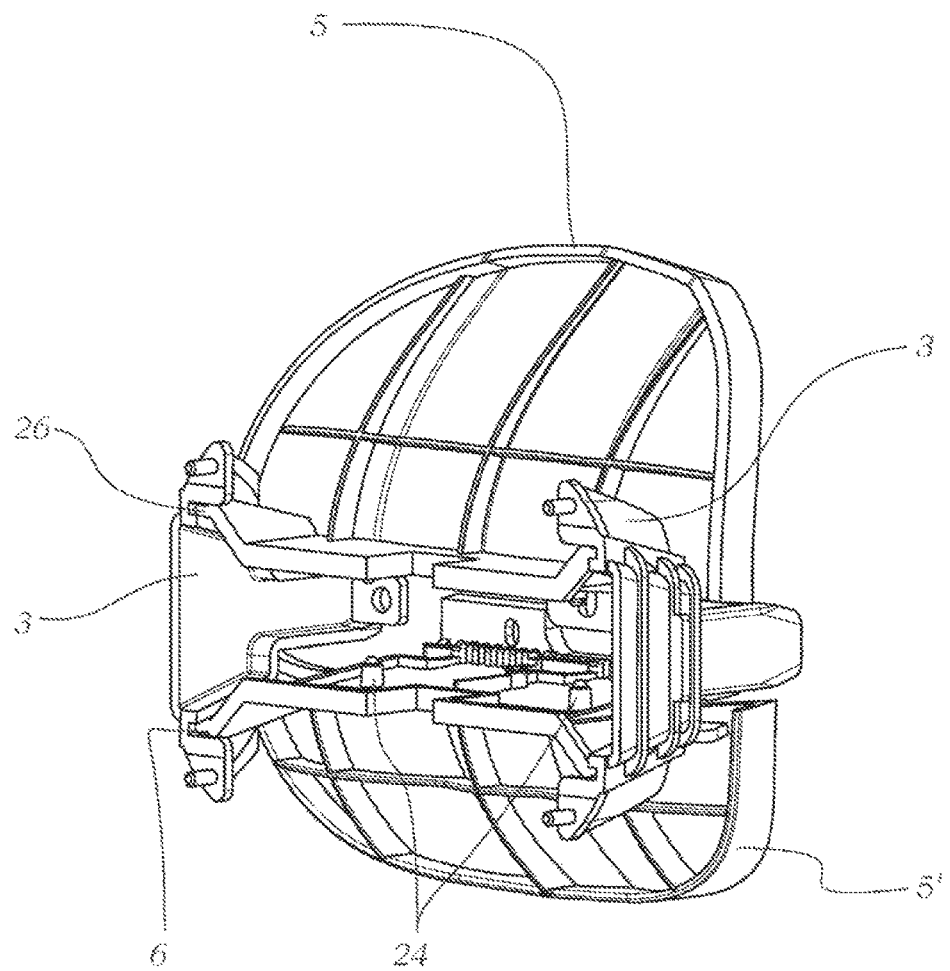

The invention is explained in detail below on the basis of a sample embodiment that is schematically illustrated in the drawing. The figures in the drawing are as follows:

FIG. 1 A perspective overall view of an inventive light module;

FIG. 2 A perspective representation of the pair of guide rails for the reflector part;

FIG. 3 A perspective representation of a guide part for an inventive vehicle headlight;

FIG. 4 A perspective representation of a light source support comprising a circuit board;

FIG. 5 and FIG. 6 A perspective representation of reflector parts;

FIG. 7 A sectional view through a light module of an inventive vehicle headlight;

FIG. 8 A detail view of the area of FIG. 7 marked by circle A;

FIG. 9 A sectional view of the light module, wherein reference pins are engaged with the circuit board;

FIG. 10 A representation of the light module according to FIG. 8, wherein the reference pins are not engaged in the circuit board; and FIG. 11 A perspective representation of two reflector parts and the associated guide rails.

In FIG. 1, a light module of an inventive vehicle headlight is designated with 1. The light module 1 consists of a guide part 2, into which a light source support 3 in the form of a heat sink can be pushed with cooling elements 4. When the light source support 3 is pushed into the guide part 2, a reflector part 5 (or 5') is displaced along guide rails 6, which are designed so that, as can already be seen in FIG. 1, displacement of the light source support 3 in the direction of arrow 7, and thus displacement of the reflector part 5 (or 5') in the direction of arrow 7, lowers the reflector part 5 in the direction of arrow 8, due to the inclined arrangement of the guide rails 6. Likewise, the reflector part 5' is displaced in the direction of the arrow 9 when the pushing in is done. A cover is labeled with 10.

FIG. 2 represents a pair of guide rails 6 in one part of the guide part 2. The pair of guide rails 6 is inclined with respect to a light source support plane E symbolized by the two dashed lines, and is suitable to hold and guide reflector parts (not shown in FIG. 2). Reference number 11 designates a hole that serves to fix the part shown in FIG. 2, it being possible, for example, for screws (not shown) to pass through the hole 11 and the holes 12 in FIG. 3 for fixation. Furthermore, pins 13 and 13' engage in corresponding holes 14 and 14' (FIG. 3). In FIG. 3 it can also be seen that the guide part 2 has a large cutout 15, into which a light source support 3 (not shown in FIG. 3) can be pushed.

FIG. 4 now shows the light source support 3 with a circuit board 16 fixed on the support part 20 of the light source support 3, the circuit board 16 having LED light sources 17 located on it. The light source support 3 offers essentially a planar supporting surface 18 for the circuit board 16, which in this case is fixed using screws 19, however it can also be fixed in any other conceivable way. It is obvious for the person skilled in the art that opposite the supporting surface 18 there can be another supporting surface on which all functionalities that have already been described and that are yet to be described can be realized in an identical manner. Reference number 4 designates cooling elements that serve to release to the environment the heat that is formed on the LED light sources 17 and that is conducted away by the support part 20, and thus provide efficient cooling of the LED light sources 17. Fastening tabs 29 serve to fix the light source support 3 to the guide part 2. Furthermore, reference numbers 21 designate reference pins for corresponding reference holes on the reflector part. FIG. 4 also shows an opening 30 in the immediate vicinity of a plug 31 on the circuit board, which makes it possible to separate the circuit board from a corresponding cable before pulling out the light source support 3.

FIG. 5 shows a reflector part 5 that has a catch 22 with a reference hole 23 for the reference pin 21 shown in FIG. 4. The reflector part 5 has reference pins 24 which can engage in corresponding reference holes 25 in the circuit board 16, if the reflector part 5 is located in a correct position with respect to the LED light sources 17 (see FIG. 4). This is ensured by the effect of the guide rails 6, which cooperate with corresponding rails 26 on the reflector part 5.

The parts just described have the same reference numbers in the representation of the second reflector part 5' according to FIG. 6.

In FIG. 7 it can be seen that the light source support 3 cooperates with the catches 22 of reflector parts 5 and 5', which are moved along the guide rails 6 in the direction of the arrows 8 and 9, i.e., toward the respective circuit board 16, when the light source support 3 is pushed in the direction of arrow 7.

FIG. 8 shows that the light source support 3 has an ejector 27 on it, which cooperates with a corresponding counterpart 28 on the reflector part 5 when the light source support 3 is pulled out, to displace the reflector part 5 along the guide rails 6 into a release position in which the reference pins 24 shown in FIGS. 8 and 9 are raised into a position in which they are clear of the conductor tracks of the circuit board 16.

As was already mentioned, this can be seen in FIG. 9, where the reference pins 24 engage into the circuit board 16, in particular into the reference holes 25 in the circuit board 16, and optimally align the reflector part 5 with the LED light sources (not shown in FIG. 9). While FIG. 9 shows the state in which the light source support 3 has been pushed into the guide part 2, so that the reflector part 5, together with the light source support 3, has been pushed forward along the guide rails 6, to bring the reference pins 24 on the reflector part 5 into an operative connection with the reference holes 25 in the circuit board 16 when the light source support 3 is pushed in, FIG. 10 shows the state in which the light source support 3 has been pulled back, the effect of the ejector 27 having pulled the reflector part 5 back and displaced it upward (arrow 9), so that the reference pins 24 no longer engage with the reference holes 25 on the circuit board 16. The action of the catch 27, which was able to cooperate with the counterpart 28, raised the reflector part 5 far enough to create a sufficient distance between the reference pins 24 and the conductor tracks of the circuit board 16 to avoid damage to the circuit board 16 when the light source support 3 was pulled further out.

As was already mentioned further above, all described functionalities can also be achieved on the bottom of the light source support 3, i.e., on the bottom of the support part 20 (in relation to reflector part 5'); for brevity and clarity, this description largely omits repetition of the functions and functional flow.

FIG. 11 once again shows the cooperation of the reflector part 5 with the guide part 2, and it can be seen that the rails 26 on the reflector parts 5 cooperate with the corresponding guide rails 6 to allow the reflector part 5 (or 5') to be guided in such a way that the reference pins 24 on the reflector part 5 (or 5') enter into an operative connection with the corresponding reference holes in the circuit board when the light source support 3 (not shown in FIG. 10) is pushed in.

LIST OF REFERENCE NUMBERS

1 Vehicle headlight
2 Guide part
3 Circuit board support
4 Cooling elements
5, 5' Reflector
6 Guide rails
7, 8, 9 Arrow
10 Covering
11 Hole
12 Hole
13 Reference pin
14 Reference hole
15 Cutout
16 Circuit board
17 LED light source
18 Supporting surface
19 Screw
20 Support part
21 Reference pin
22 Catch
23 Hole
24 Reference pin
25 Reference hole
26 Rail
27 Ejector
28 Counterpart
29 Fastening tab
30 Opening
31 Plug

The invention claimed is:
1. A vehicle headlight comprising:
a light module (1) with a light source support (3);
at least one light source (17); and
a reflector part (5) associated with the at least one light source (17),
wherein the reflector part (5) comprises reference elements (24) on the reflector part (5) configured to be brought into an operative connection with corresponding reference elements (25) on the light source support (3), and
wherein the light source support (3) is configured to be pushed into a guide part (2) with guide rails (6) for the reflector part (5), and the reflector part (5) has a catch (22) associated with the light source support (3) to displace the reflector part (5) together with the light source support (3) along the guide rails (6), which are designed to bring the reference elements (24) on the reflector part (5) into an operative connection with the corresponding reference elements (25) on the light source support (3) when the light source support (3) is pushed in.

2. The vehicle headlight of claim 1, wherein the light source support (3) comprises a circuit board on which the light sources and the reference elements (25) are arranged.

3. The vehicle headlight of claim 2, wherein the light source support (3) has an ejector (27) on it for the reflector part (5), so that as the light source support (3) is pulled out, the reflector part (5) is displaced along the guide rails (6) into a release position in which the reference pins (24) on the reflector part (5) are raised, by means of the guide rails (6), into a position in which they clear conductor tracks of the light source support (3).

4. The vehicle headlight of claim 1, wherein the catch (22) on the reflector part (5) has at least one reference hole (23) for engagement of reference pins (21) on the light source support (3).

5. The vehicle headlight of claim 1, wherein the light source support (3) is in the form of a heat sink for the light sources (16).

6. The vehicle headlight of claim 2, wherein the light source support (3) consists of cast aluminum and has multiple cooling elements (4) on its end facing away from the circuit board (16).

7. The vehicle headlight of claim 1, wherein the guide part (2) consists of plastic.

8. The vehicle headlight of claim 1, wherein the reflector part (5) comprises multiple reflectors.

9. The vehicle headlight of claim 1, wherein the guide part (2) comprises guide rails (6) for at least two reflector parts (5, 5') that are opposite one another with respect to a light source support plane (E).

10. The vehicle headlight of claim 1, wherein the at least one light source (17) is in the form of an LED light source.

\* \* \* \* \*